United States Patent [19]
Distinti et al.

[11] Patent Number: 6,144,327
[45] Date of Patent: Nov. 7, 2000

[54] PROGRAMMABLY INTERCONNECTED PROGRAMMABLE DEVICES

[75] Inventors: Robert J Distinti, Fairfield; Harry F Smith, Newtown, both of Conn.

[73] Assignee: Intellectual Property Development Associates of Connecticut, Inc., Trumbull, Conn.

[21] Appl. No.: 08/909,838

[22] Filed: Aug. 12, 1997

Related U.S. Application Data

[60] Provisional application No. 60/024,012, Aug. 15, 1996.

[51] Int. Cl.[7] .................................................. H03M 1/00
[52] U.S. Cl. .......................................... 341/126; 711/100
[58] Field of Search .............................. 341/110, 88, 111, 341/112, 144, 155, 126, 137; 326/37, 38, 39, 41; 348/552; 711/1, 100, 103

[56] References Cited

U.S. PATENT DOCUMENTS

| | | | |
|---|---|---|---|
| 4,709,344 | 11/1987 | Crawford | 364/724 |
| 4,870,302 | 9/1989 | Freeman | 307/465 |
| 4,875,020 | 10/1989 | Daniele et al. | 330/307 |
| 4,940,909 | 7/1990 | Mulder et al. | 307/465 |
| 5,107,146 | 4/1992 | El-Ayat | 307/465 |
| 5,196,740 | 3/1993 | Austin | 307/303 |
| 5,202,687 | 4/1993 | Distini | 341/158 |
| 5,245,262 | 9/1993 | Moody et al. | 318/560 |
| 5,264,931 | 11/1993 | Yamada | 358/160 |
| 5,335,186 | 8/1994 | Tarrant | 364/550 |
| 5,361,373 | 11/1994 | Gilson | 395/800 |
| 5,457,644 | 10/1995 | McCollum | 364/716 |
| 5,600,845 | 2/1997 | Gilson | 395/800 |
| 5,712,628 | 1/1998 | Phillips et al. | 340/825.54 |
| 5,821,776 | 10/1998 | McGowan | 326/41 |
| 5,834,773 | 11/1998 | Olnowich et al. | 370/60 |
| 5,887,165 | 3/1999 | Martel et al. | 395/653 |
| 5,890,005 | 3/1999 | Lindholm | 395/750.03 |

FOREIGN PATENT DOCUMENTS

| | | |
|---|---|---|
| 0 322 382 A2 | 6/1989 | European Pat. Off. . |
| WO 95/32481 | 11/1995 | WIPO . |

OTHER PUBLICATIONS

"Prototype Design of a Field–Programmable Analog Array", Edward K.F. Lee, et al. Proceedings, 1990 Canadian Conference, Aug. 30, 1990, pp. 2.2.1–2.2.8.

"A CMOS Field–Programmable Analog Array", Edward K.F. Lee, et al., IEEE Int. Solid State Circuits Conf., vol. 34, Feb. 1, 1991, pp. 186–187, 314.

"IMP Introduces First Programmable IC To Monitor Analog Signals", Carolyn Boone, News Release, Feb. 20, 1996, 5 pages.

Product Brochure, Electrically Programmable Analog Circuit Design Handbook, IMP, Inc. 1996, Sections 1 and 2.

*Primary Examiner*—Peguy Jean Pierre

[57] ABSTRACT

Disclosed is an integrated circuit comprising a substrate having a plurality of digital signal processors, including at least one analog circuit block, and means on said substrate for programmably interconnecting said processors and said at least one analog circuit block together. Also disclosed is a programming system comprising means for converting a programmable analog array specification into one or more programs executable by one or more digital signal processors so as to perform the identical or substantially identical function or functions as the programmed analog array.

33 Claims, 2 Drawing Sheets

PROGRAMMABLY INTERCONNECTED PROGRAMMABLE DEVICES

CLAIM OF PRIORITY FROM A COPENDING PROVISIONAL PATENT APPLICATION

Priority is herewith claimed under 35 U.S.C. §119(e) from copending Provisional Patent Application Ser. 60/024,012, filed Aug. 15, 1996, entitled "Programmably Interconnected Programmable Devices", by R. J. Distinti et al. The disclosure of this Provisional Patent Application is incorporated by reference herein in its entirety.

FIELD OF THE INVENTION

This invention relates generally to programmable analog and digital circuit arrays and, in particular, to methods and apparatus for configuring such circuits arrays.

BACKGROUND OF THE INVENTION

In the past decade data processor clock speeds have increase from 10 MHz to 100 MHz and beyond. It is conceivable that processor clock speeds will increase by the same amount over the next decade, perhaps attaining speeds as high as 2,000 MHz. With these advances, digital signal processing will replace many current applications that today utilize analog circuits to condition and manipulate analog signals.

This is a desirable development, in that analog circuits typically require zeroing for accuracy as they tend to drift with age and environment. Analog circuits are also susceptible to noise. Furthermore, most analog circuits are not very "changeable" after they are constructed; whereas a digital processor device can be reprogrammed after construction. Although digital processors can be reprogrammed, they are still limited in the way they are interconnected to other devices.

Furthermore, some currently available programmable analog circuit arrays provide a computer program and method for specifying the interconnections between analog circuit modules or functions. Once interconnected in the desired configuration and subsequently tested and qualified, some hundreds or thousands of identically constructed analog arrays can be produced, either by programming other programmable arrays or by mask programming arrays at manufacture.

Reference in this regard can be had, by example, to a publication entitled "Electrically Programmable Analog Circuit Design Handbook", IMP, Inc., 1996, for a description of one type of programmable analog circuit array and to a software development system for same (Chapter 2).

As can be appreciated, it would be desirable to provide a mechanism to convert or migrate such a design into the digital domain. At present, such a mechanism is not known to exist.

OBJECTS OF THE INVENTION

It is a first object of this invention to provide an improved analog and digital integrated circuit architecture that overcomes the foregoing and other problems.

It is a second object of this invention to provide methods and apparatus to convert a programmable analog array specification into a program executable by one or more digital signal processors, so as to perform the identical or substantially identical function or functions as the analog array.

SUMMARY OF THE INVENTION

In accordance with an aspect of this invention, the inventors have eliminated the interconnectivity drawback by incorporating a plurality of digital processors and support devices onto a single substrate. The digital processors and support devices are programmably interconnected to achieve a desired architecture. These programmably interconnected programmable (PIP) devices may be considered as "liquid" circuits, and are used to create a Programmable Signal Processing Array (PSPA). The concept is similar in some respects to field programmable gate array (FPGA) devices, except that the logic elements of the FPGA are replaced with entire processors that can be individually programmed to perform desired analog and digital functions.

In accordance with this invention, a substrate comprises a plurality of digital data processors, such as digital signal processors and/or RISC processors, and related support devices, including analog circuit blocks if desired, that can be programmably interconnected together.

Also disclosed are methods and apparatus to convert a programmable analog array specification into a program executable by one or more digital signal processors, such as those found in the aforementioned PSPA device, so as to perform the identical or substantially identical function or functions as the programmed analog array.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
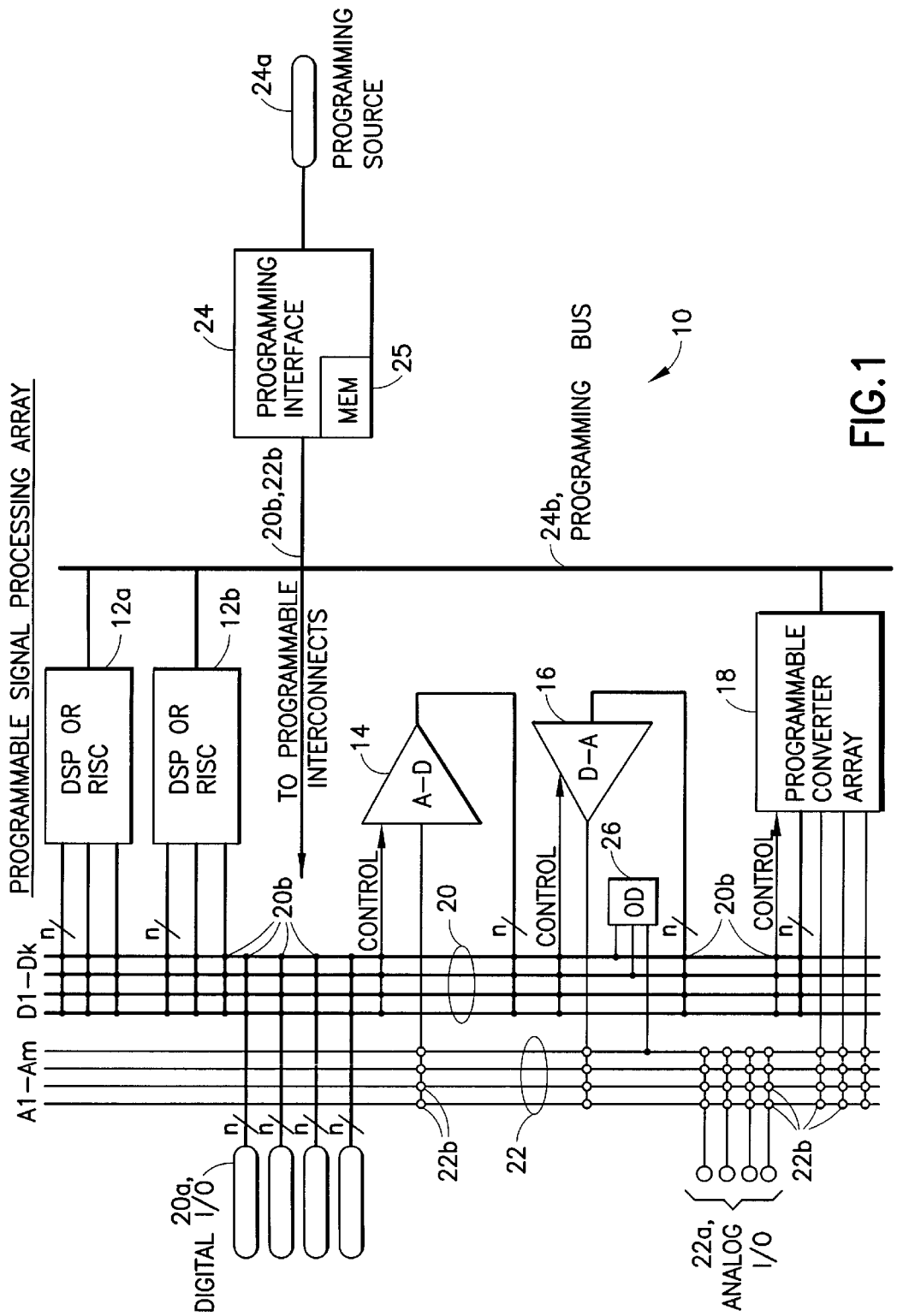
FIG. 1 is a block diagram of one embodiment of a PSPA device in accordance with the teaching of this invention.

Referring to FIG. 1, therein is illustrated an exemplary embodiment of a Programmable Signal Processing Array (PSPA) 10 having programmably interconnected programmable (PIP) devices. The PSPA 10 includes at least one, and preferably at least two, digital signal processors (DSPs) and/or Reduced Instruction Set (RISC) processors 12a and 12b as digital processing elements. Support circuitry, such as an A-D converter 14 and a D-A converter 16, may also be provided, as may a programmable converter array (PCA) 18. The PCA 18 may be similar to that described in U.S. Pat. No. 5,202,687, which is incorporated by reference herein in its entirety. The PCA 18 may also be similar to that described in, by example, the above-referenced IMP, Inc. publication and/or in WO 95/32481, entitled "Integrated Circuit Having Programmable Analog Modules with Configurable Interconnects Between Them".

A multi-line D1–Dk digital bus 20 (e.g., including at least data and control lines) interconnects the processors 12a and 12b with a plurality of configurable n-bit data paths, and receives an input from the A-D 14 and provides an input to the D-A 16. If the PCA 18 includes digital circuitry, then the digital bus 20 can also be coupled thereto. The digital bus 20 is also coupled to digital I/O terminals of the PSPA device 10. A plurality of programmable digital multiplexers or cross-point switches 20b are provided for programmably interconnecting the devices and I/O terminals coupled to the digital bus 20.

A multi-line (A1–Am) analog bus 22 similarly provided, and provides an input to the A-D 14 and receives an output from the D-A 16. If provided, the analog bus 22 is also coupled to the PCA 18, as well as to analog I/O terminals 22a of the PSPA device 10. As with the digital bus 20, a plurality of programmable analog multiplexers or cross-point switches 22b are provided for programmably interconnecting the devices and I/O terminals coupled to the analog bus 20. By example, the input of A-D converter 14 can be programmably coupled to any one of the A1–Am lines of the analog bus 22, and the output of the D-A converter 16 can be likewise so coupled.

The PSPA device 10 is well suited for digital signal processing applications. Here, for example, each DSP or RISC 12a or 12b can be assigned a single process in the conditioning of a signal. For example, the DSP 12a may perform a filter function, the DSP 12b a mixing function, and a third DSP (not shown) a detection function, etc. By example, a single PSPA 10 may replace all or most of the circuitry following the radio frequency (RF) intermediate frequency (IF) section of a conventional television (TV) or a high definition television (HDTV) set. As processor clock speeds increase, it may be possible to also replace the IF section as well, or even eliminate the RF sections.

One advantage of the PSPA 10 is that, by example, if ever the TV or HDTV standard changes, the PSPA 10 can be reprogrammed through a programming interface 24, via program input 24a, so as to modify the processing of the analog TV signals to comply with the changed standard. For example, a TV station, or a cable operator, or a satellite TV provider, or a data communications network (e.g., an Internet site such as a World Wide Web (WWW) site) may reprogram a PSPA-implemented television set to optimize it for a desired display standard. The PSPA device 10 can thus be remotely programmed and reprogrammed through the programming interface. Audio functions can be programmed in a similar manner. The program input 24a may be the same input as the input on which a video and/or audio signal is received, in which case the programming input 24a may be one of the pins of the analog I/O 22a. In this case a suitable circuit is provided in the programming interface 24 to extract the programming information from the input video signal.

Related to the foregoing, the use of the teaching of this invention enables a television set constructed in accordance with a modern standard to be reprogrammed to be compatible with an earlier standard, or with a foreign standard, enabling previously recorded video media to still be viewed and/or the television set to be usable in different countries supporting different broadcast standards. By example, persons having a NTSC video tape collection can be enabled to still view their collection, by reprogramming the video system to be "backwards" compatible with the NTSC-formatted media.

The foregoing techniques can be applied as well to radio communications. By example, a radio receiver constructed to include a PSPA 10 can be selectively programmed to perform either FM or AM signal demodulation.

Further by example, military radio systems, such as those that use switched frequency techniques to prevent jamming, can be provided with a PSPA 10 to enable switched modulation schemes as well, thereby providing enhanced immunity to jamming or interception. Chaotically changing modulation schemes can also be programmably implemented.

A PSPA 10 may be configured as a pure digital, a pure analog, or a hybrid analog and digital processing array (as shown in FIG. 1). The PSPA 10 has great advantages over conventional programmable analog arrays because it is not reliant on the only the specific types of circuit modules that are contained within the array. For example, at one time one of the DSP or RISC processors 12a or 12b may implement a comb filter, while at another time the same processor may implement a programmable gain amplifier, all under program control.

In summary, the PSPA 10 is preferably a monolithic integrated circuit device (although thick or thin film hybrid type devices can also be employed) that contains one or more digital computational devices 12a and 12b capable of being selectively coupled to an array of digital buses 20. Each processor can be a self-contained RISC microcomputer or Digital Signal Processor (DSP) having its own local memory and at least one I/O Port of n bits. The digital buses (D1 to Dk) each contain n conductors in parallel. The value of n is preferably chosen to correspond to the digital word size of the processors, or some multiple or sub-multiple thereof. The I/O ports of the processors 12a, 12b can be selectively coupled to one or more of the digital buses electrically. The coupling can be performed with, by example, fusible links, electrically programmable links, bilateral analog switches, cross-point switch matrices, or digital gating. Digital gating is the least preferred, since the buses are typically bi-directional. The digital buses 20 can be selectively coupled to circuits outside the PSPA 10 through one or more of the digital I/O ports 20a.

The PSPA 10 may also contain one or more analog buses (A1–Am). Each analog bus 22 is one conductor (or a balanced pair of conductors) used in the distribution of analog signals within the PSPA 10. An analog bus 22 can be selectively coupled to any digital bus through either the A-D converter 14, the D-A converter 16, or the programmable converter array 18. The programmable converter array 18 can be configured for a variety of functions to include log companding, decibel conversion, attenuation conversion, etc. The analog buses 22 can also be selectively coupled to external circuitry through one or more of the analog I/O ports 22a.

The converters 14, 16, 18 may require control signals to synchronize them to the processors 12a, 12b; furthermore, the processors 12a, 12b may need to interrupt one another or provide handshaking signals when transferring data between them. Therefore at least one digital bus 20 preferably has the capability to selectively couple individual bits. For example, the digital bus D3 (assume n=16 bits) can be designated as a control bus wherein DSP 12a uses bits 0–3 of D3 to control the A-D converter 14, while DSP 12b uses bits 4–6 of D3 to control the D-A converter 16, while bits 7–11 are used to control the flow of information from DSP 12a to DSP 12b. The remaining bits of D3 may be coupled to a digital I/O port 20a for providing handshaking or other signals with external circuitry.

The programming for the configuration of the PSPA 10, as well as the software for the processors 12a, 12b (referred to hereinafter as "codeware"), is accomplished through the external programming interface 24 and 24a. The programming interface 24 in turn drives an internal programming bus 24b for the DSP/RISC processors 12a, 12b and the digital and analog bus interconnects 20b and 22b, respectively,. The programming interface 24 may be a microprocessor-type interface with address and data buses to allow an external programming device, such as a microprocessor, to have high speed parallel access. It may also be a serial interface to optimize packaging and the numbers of required terminals. As was mentioned above, the programming interface 24 may also include circuitry for extracting programming information from an input analog, video, and/or audio signal. The codeware can be internally stored in a non-volatile medium or in a high speed RAM-type medium, such as a memory 25 contained with the programming interface 24. The non-volatile medium (such as PROM, EPROM, etc.) is preferred for embedded systems where the PSPA 10 must stand alone. The non-volatile memory system allows codeware to be changed or modified quickly. This is important for prototyping an embedded system, or when the PSPA 10 is to be used as part of a data processing network.

The PSPA 10 may also include the ability for one or more of its processors to have read/write access to the PSPA codeware in the memory 25. This enables the processor or processors to modify the codeware, a feature especially desirable for neural network synthesis applications.

In a further embodiment of this invention, most or all of the analog circuit blocks are removed (e.g., A-D 14, D-A 16, PCA 18). The result is an array of processors and digital support circuits, such as serial ports or counter timer circuits.

It is within the scope of this invention to provide two or more DSPs on the substrate, and to keep one in reserve for future enhancements.

The DSPs 12a, 12b can be each constructed in a conventional fashion, and may resemble currently available DSPs, such those available from a number of manufacturers well known to those skilled in the art.

It is also within the scope of this invention to provide one or more optical devices (OD) 26, such as one or more of emitters, receivers, conductors, waveguides, switches, and/or wavelength converters, on the substrate of PSPA 10 so as to be programmably interconnected with at least one of the digital or analog buses, and to perform at least some of the processing and/or signal interconnect functions using optical radiation. In this case at least one of the signal buses 20, 22 is an optical conductor formed on or within the substrate. It is also within the scope of this invention to provide an optical port as an input, output, or input/output interface to the PSPA 10. For example, a modulated optical signal is applied to the PSPA 10 through an optical port, is detected and converted to an analog electrical signal, the analog electrical signal is processed by the A/D converter 14, and the resulting digital signal is further processed by one or more of the DSP devices 12a, 12b. If desired, the resulting processed digital information is converted to an analog signal by the D/A converter 16, and is used to modulate an output of another optical device (e.g., a laser diode) which is then output through the same or a different optical port.

Figure 2:
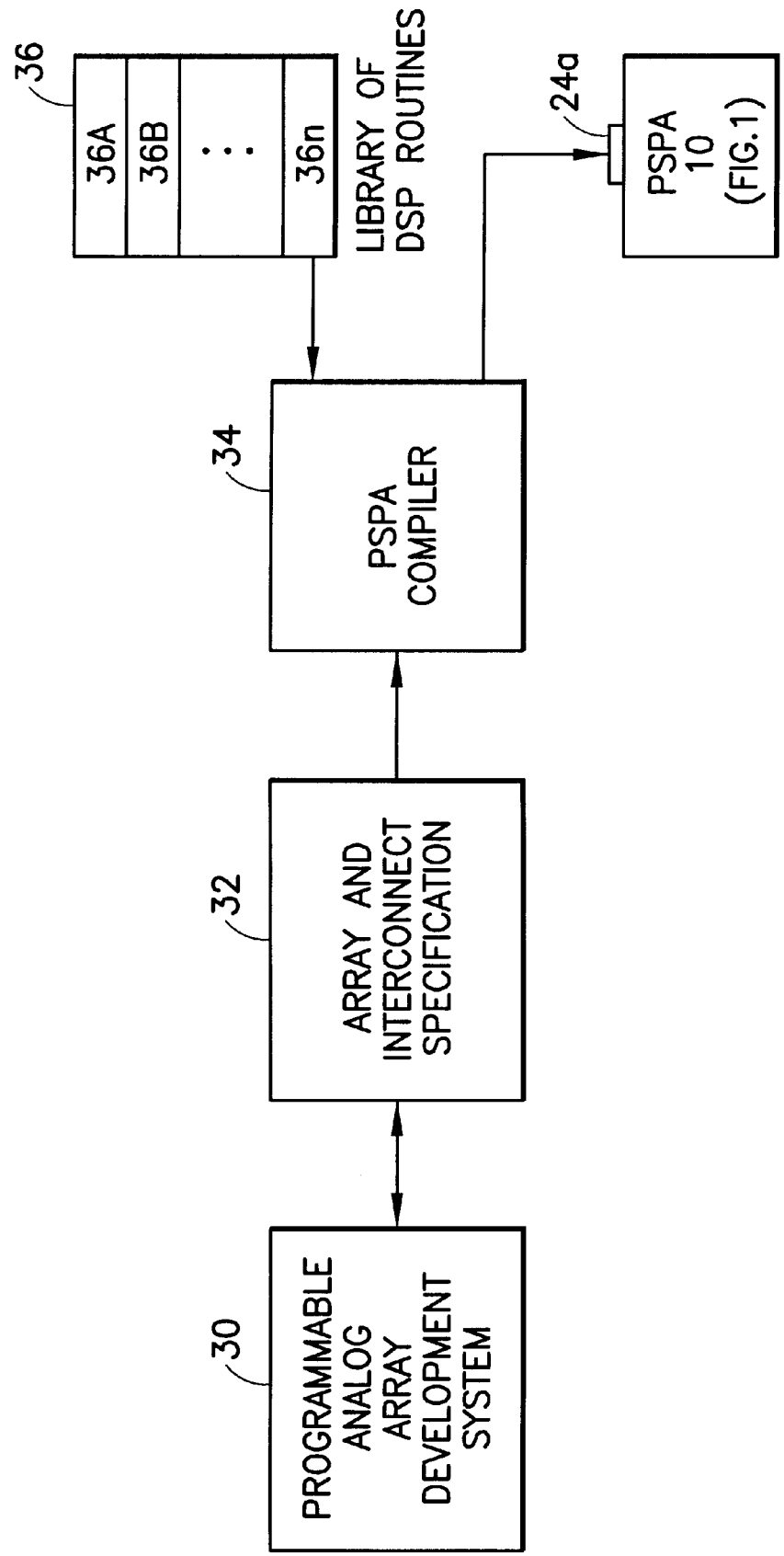
FIG. 2 is a block diagram of a system for converting a programmable analog array specification into one or more program modules executed by one or more digital signal processors, such as the PSPA device of FIG. 1.

Reference is now made to FIG. 2 for illustrating a further embodiment of this invention. This embodiment is useful for translating an interconnect specification for a programmable analog array into corresponding DSP operating instructions usable in, by example, a signal DSP or a plurality of same such as the PSPA 10 of FIG. 1.

A programmable analog array development system 30 is assumed to include a data processor and a program for deriving an interconnect specification for a programmable array. One suitable, but not limiting type, of development system is described in the above-referenced Electrically Programmable Analog Circuit Design Handbook (1996). Coupled to the system 30 is a memory device 32 (such as a disk, tape, etc.) that stores a resultant programmable analog array and interconnect specification. By example, the analog array may have been programmed to perform a desired function or functions such as a variable gain amplifier having an output connected to a sample and hold function, a comparator function, and an A-D function.

In accordance with this aspect of the invention a PSPA compiler 34 is coupled to the array and interconnect specification stored in memory 32, and is also coupled to a library of DSP routines 36, such as routines 36A–36n that are predetermined to implement amplification, sampling, comparisons, filtering, etc., functions. The PSPA compiler 34 operates to examine the array and interconnect specification stored in memory 32 and to translate or convert same into a corresponding one or more DSP programs that execute the same function or functions, but in the digital domain. A table lookup or some other suitable conversion technique can be used. For the case where a single DSP is used, the compiler 34 may simply download the required DSP code into a memory accessible by the DSP. Alternately, and in accordance with the teaching of this invention, the PSPA compiler 34 has knowledge of the PSPA 10 architecture and capabilities, and converts the array and interconnect specification in the memory 32 into suitable DSP and/or RISC programs, and also corresponding interconnect specifications for the PSPA 10 of FIG. 1. The resulting codeware is downloaded to the programming interface 24 shown in FIG. 1. In this manner the analog functions specified for the programmable analog array by the development system 30 are transformed into corresponding digital signal processor programs that are executed by the PSPA 10. The programs can be implemented in a purely digital manner, or can be implemented in conjunction with the analog support circuitry 14, 16 and 18 shown in FIG. 1, as required.

While the invention has been particularly shown and described with respect to preferred and exemplary embodiments thereof, it will be understood by those skilled in the art that changes in form and details may be made therein without departing from the scope and spirit of the invention.

What is claimed is:

1. An integrated circuit comprising a substrate on which are fabricated a plurality of digital processors, at least one analog signal processing circuit block, and a plurality of buses coupled to externally programmable interconnect means for interconnecting together said plurality of digital processors and said at least one analog signal processing circuit block in a predetermined configuration, wherein said plurality of buses of said integrated circuit comprise at least one signal bus comprising an optical conductor.

2. An integrated circuit as in claim 1, and further comprising a programming interface having inputs coupled to a programming source and outputs coupled to said plurality of digital processors.

3. An integrated circuit as in claim 1, and further comprising a programming interface having inputs coupled to a programming source and outputs coupled to said externally programmable interconnect means.

4. An integrated circuit as in claim 1, wherein said plurality of buses comprise at least one digital signal bus coupled to said plurality of digital processors and at least one analog signal bus coupled to said at least one analog signal processing circuit block, and wherein said externally programmable interconnect means is coupled to said at least one digital signal bus and to said at least one analog signal bus.

5. An integrated circuit as in claim 4, wherein said at least one analog signal processing circuit block is comprised of an analog to digital converter, and wherein an input of said analog to digital converter is programmably coupled to said at least one analog signal bus, and an output of said analog to digital converter is programmably coupled to said at least one digital signal bus.

6. An integrated circuit as in claim 4, wherein said at least one analog signal processing circuit block is comprised of a digital to analog converter, and wherein an input of said digital to analog converter is programmably coupled to said at least one digital signal bus, and an output of said digital to analog converter is programmably coupled to said at least one analog signal bus.

7. An integrated circuit as in claim 1, wherein at least one of said digital processors is a digital signal processor.

8. An integrated circuit as in claim 1, wherein at least one of said digital processors is a reduced instruction set digital processor.

9. An integrated circuit as in claim 1, and further comprising at least one optical device disposed on said substrate, said optical device having at least one of an input or an output coupled to said optical conductor.

10. An integrated circuit as in claim 1, and further comprising at least one digital signal input or output port that is programmably coupled to at least one of said plurality of digital processors, and at least one analog signal input or output port that is programmably coupled to said at least one analog signal processing circuit block.

11. An integrated circuit as in claim 9, and further comprising at least one optical input or output port that is coupled to said optical device through said optical conductor.

12. An integrated circuit as in claim 1, and further comprising a programming interface having inputs coupled to a source of a television signal and outputs coupled to said externally programmable interconnect means.

13. An integrated circuit as in claim 1, and further comprising a programming interface having inputs coupled to a data communications network and outputs coupled to said externally programmable interconnect means.

14. An integrated circuit as in claim 1, and further comprising a programming interface having inputs coupled to an Internet site and outputs coupled to said externally programmable interconnect means.

15. A programming system comprising means for converting a stored analog array specification into one or more stored programs executable by one or more digital signal processors so as to perform an identical or substantially identical function or functions as an analog array programmed in accordance with said stored analog array specification, wherein said system has an output coupled to an integrated circuit comprising a substrate on which are fabricated at least one digital processor, at least one analog signal processing circuit block, a plurality of buses coupled to externally programmable interconnect means for interconnecting together said at least one digital processor and said at least one analog signal processing circuit block in a predetermined configuration, and a programming interface having inputs coupled to said output of said programming system, and outputs coupled to said at least one digital processor and to said externally programmable interconnect means, wherein said stored programs are expressive of program code for said at least one digital processor and switching instructions for causing said externally programmable interconnect means to assume a predetermined interconnect state, and wherein said integrated circuit is further comprised of at least one optical device disposed on said substrate, said optical device having at least one of an input or an output coupled to an optical conductor formed on or within said substrate, and further comprising at least one optical input or output port that is coupled to said optical device through said optical conductor.

16. A programming system as in claim 15, wherein said plurality of buses comprise at least one digital signal bus coupled to said at least one digital processor and at least one analog signal bus coupled to said at least one analog signal processing circuit block, and wherein said externally programmable interconnect means is coupled to said at least one digital signal bus and to said at least one analog signal bus.

17. A programming system as in claim 16, wherein said at least one analog signal processing circuit block is comprised of an analog to digital converter, and wherein an input of said analog to digital converter is programmably coupled to said analog signal bus, and an output of said analog to digital converter is programmably coupled to said digital signal bus, and wherein said at least one analog signal processing circuit block is further comprised of a digital to analog converter, and wherein an input of said digital to analog converter is programmably coupled to said digital signal bus, and an output of said digital to analog converter is programmably coupled to said analog signal bus.

18. An integrated circuit comprising a substrate on which are fabricated a plurality of digital processors and a plurality of buses coupled through a programming interface to an external program source, said programming interface being responsive to programming information received from said external program source for selectively coupling together said plurality of digital processors in a predetermined configuration, and said integrated circuit further comprising at least one optical device circuit block that is coupled to at least one of said buses and being selectively coupled together with at least one of said plurality of digital processors in the predetermined configuration.

19. An integrated circuit as in claim 18, and further comprising at least one analog signal processing circuit block that is coupled to at least one of said buses and being selectively coupled together with at least one of said plurality of digital processors in the instruction set digital processor.

20. An integrated circuit, comprising a substrate on which are fabricated at least two digital data processors; a plurality of buses; and a programming interface for coupling at least one of said plurality of buses to an external program source, said programming interface being responsive to programming information received from said external program source for selectively coupling together said at least two digital data processors in a predetermined configuration; said integrated circuit further comprising at least one optical device that is selectively coupled to at least one of said plurality of buses in accordance with said programming information.

21. An integrated circuit as in claim 20, wherein said at least one optical device is comprised of at least one of an optical emitter, an optical receiver and an optical conductor.

22. An integrated circuit as in claim 20, wherein said at least one optical device is comprised of at least one of an optical waveguide and an optical wavelength converter.

23. An integrated circuit as in claim 20, and further comprising at least one analog signal processing circuit block that is coupled to at least one of said plurality buses and that is selectively coupled to at least one of said at least two digital data processors in accordance with said programming information.

24. An integrated circuit as in claim 20, and further comprising circuitry for extracting said programming information from an input video signal.

25. An integrated circuit as in claim 20, and further comprising circuitry for extracting said programming information from an input audio signal.

26. An integrated circuit as in claim 20, wherein said external program source comprises a unit that is coupled to said programming interface through the Internet.

27. An integrated circuit as in claim 20, wherein said external program source comprises a unit that is coupled to said programming interface through the World Wide Web.

28. An integrated circuit as in claim 20, and further comprising a memory for storing received programming information, and wherein at least one of said first and second digital data processors has read/write access to said memory for modifying stored programming information.

29. An integrated circuit, comprising a substrate on which are fabricated a plurality of digital logic blocks; a plurality of buses; and a programming interface for coupling at least one of said plurality of buses to an external program source, said programming interface being responsive to programming information received from said external program source for selectively coupling together said plurality of digital logic blocks in a predetermined configuration; said integrated circuit further comprising at least one optical device that is selectively coupled to at least one of said plurality of buses in accordance with said programming information.

30. An integrated circuit as in claim 29, and further comprising at least one analog signal processing circuit block that is coupled to at least one of said plurality buses and that is selectively coupled to at least one of said at plurality of digital logic blocks in accordance with said programming information.

31. An integrated circuit as in claim 29, and further comprising a memory for storing received programming information, wherein at least some of said digital logic blocks are organized into at least one digital data processor, and wherein said at least one digital data processor has read/write access to said memory for modifying stored programming information.

32. An integrated circuit as in claim 29, wherein said programming interface comprises circuitry for extracting said programming information from at least one of an input video signal or an input audio signal.

33. An integrated circuit as in claim 29, wherein said programming interface comprises circuitry for extracting said programming information from a least one of an input television signal or an input radio signal.

* * * * *